United States Patent [19]

Carriere

[11] Patent Number: 5,162,025
[45] Date of Patent: Nov. 10, 1992

[54] T-DRIVE POWERTRAIN ASSEMBLY

[75] Inventor: Donald L. Carriere, Livonia, Mich.

[73] Assignee: Ford Motor Company, Dearborn, Mich.

[21] Appl. No.: 745,622

[22] Filed: Aug. 15, 1991

[51] Int. Cl.$^5$ ............................................. B60K 17/00
[52] U.S. Cl. .................................. 475/221; 475/198; 180/233
[58] Field of Search ............... 475/201, 206, 221, 222, 475/198; 180/233, 248

[56] References Cited

U.S. PATENT DOCUMENTS

| | | | |
|---|---|---|---|
| 775,233 | 11/1904 | Cannon | 475/222 |
| 3,378,093 | 4/1968 | Hill | 475/221 X |
| 4,140,030 | 2/1979 | Williams et al. | 180/233 X |
| 4,368,649 | 1/1983 | Vahratian et al. | 74/695 |
| 4,511,014 | 4/1985 | Makita | 180/233 |
| 4,721,011 | 1/1988 | Kubo et al. | 475/206 X |
| 4,809,807 | 3/1989 | Leiber | 180/248 X |
| 4,836,322 | 6/1989 | Sakakiyama | 180/248 X |
| 4,938,098 | 7/1990 | Sasaki et al. | 475/206 X |
| 5,033,575 | 7/1991 | Takeshita et al. | 180/233 X |
| 5,122,100 | 6/1992 | Carriere | 475/198 |
| 5,125,284 | 6/1992 | Carriere | 74/424 |

FOREIGN PATENT DOCUMENTS 654326 3/1934 Fed. Rep. of Germany .

Primary Examiner—Leslie A. Braun
Assistant Examiner—Ryan W. Massey
Attorney, Agent, or Firm—Roger L. May; Frank G. McKenzie

[57] ABSTRACT

A four-wheel drive powertrain for a vehicle having an internal combustion engine mounted transversely with respect to the fore-and-aft vehicle center plane and a gearing mechanism having a principal axis forming a cross-axis configuration with respect to the axis of the crankshaft of the engine, and a rearward controlled-slip differential adapted to transfer driving torque from the gearing mechanism to rearward traction wheels.

6 Claims, 13 Drawing Sheets

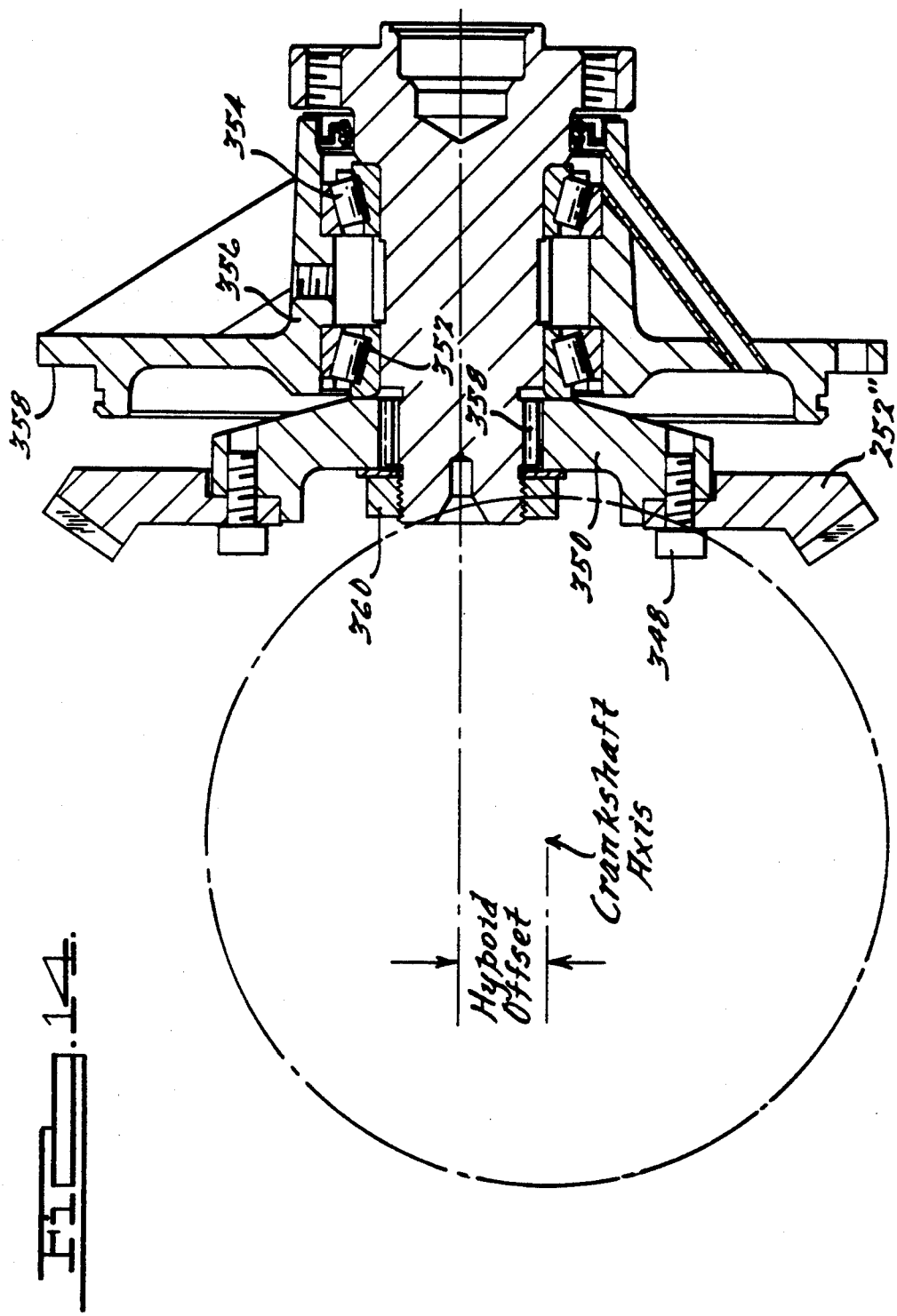

ically representation of a T-drive

T-DRIVE POWERTRAIN ASSEMBLY

TECHNICAL FIELD

My invention relates to powertrain assemblies for an automotive vehicle having an internal combustion engine with its crankshaft axis mounted transversely with respect to the center plane of the vehicle and transmission gearing mounted on an axis disposed in a "T" configuration with respect to the engine crankshaft axis including differential gearing adapted to deliver driving torque to the rear traction wheels of the vehicle as well as to the front traction wheels.

BACKGROUND OF THE INVENTION

My invention comprises improvements in the T-drive powertrain assembly disclosed in my copending U.S. patent application Ser. No. 471,759 now U.S. Pat. No. 5,125,284 filed Jan. 29, 1990, to my related U.S. patent application Ser. No. 506,144, now U.S. Pat. No. 5,122,100 filed Apr. 9, 1990, and U.S. Ser. No. 733,949, filed Jul. 22, 1991.

As indicated in the '759 application, it is usual design practice to mount the internal combustion engine of the vehicle powertrain in a transverse or east/west direction with respect to the fore-and-aft centerline of the vehicle. A multiple ratio transmission with planetary gearing is mounted on an axis in parallel relationship with respect to the engine crankshaft axis. Torque delivered through the gearing is transferred to a final drive assembly and then to a differential carrier which cooperates with differential side gears to deliver torque to each of axle half shafts. The transmission may include a hydrokinetic torque converter mounted either on the engine crankshaft axis or on the axis of the planetary gearing with the torque transfer drive between the engine crankshaft axis and the torque input shaft axis for the transmission.

As indicated in my earlier disclosure, arrangements of this kind commonly are referred to as "U-drives". The output shaft of the gearing extends in a direction transverse to the direction of the engine crankshaft to the input ends of each of two axle shafts for the traction wheels. An example of a U-drive of this kind is shown in U.S. Pat. No. 4,368,649.

A cross-axis disposition or the engine crankshaft with respect to the main transmission gearing axis of my present invention is disclosed also in my previous disclosures identified above. In each of the embodiments of my previous disclosures, torque is transferred from the engine through cross-axis gearing associated with the engine crankshaft at a midpoint position and then through a hydrokinetic torque converter to multiple torque ratio planetary gearing. A right angle drive situated between the engine and the planetary gearing forms a torque flow path to each of the two forward traction wheels of the vehicle.

In the embodiment of the T-drive powertrain disclosed in the '759 application, the hydrokinetic torque converter is situated between the engine crankshaft axis and the right angle drive portions of the powertrain. In the embodiment disclosed in the '144 application, the right angle drive and the traction wheel axes are situated adjacent the engine the engine crankshaft and the hydrokinetic torque converter. The turbine output torque of the torque converter is distributed to torque input elements of the planetary gearing through torque transfer gearing.

SUMMARY OF THE INVENTION

It is an object of my invention to provide a T-drive vehicle powertrain assembly having features that are common to the embodiments disclosed in my earlier filed applications described above. My present invention is distinguishable, however, from my earlier disclosures as well as from the prior art disclosures discussed in the specifications for my earlier applications because it is capable of transferring torque to the rearmost traction wheels of the vehicle as well as to the forward traction wheels. Provision is made for controlling the ratio of the torque distributed to the rear traction wheels relative to the torque delivered to the forward traction wheels. Provision may be made further for varying the ratio of torque transferred to the forward traction wheels and to the rearward traction wheels. If the forward traction wheels tend to slip, a greater percentage of the total torque then is distributed to the rear traction wheels, and vice versa. Under ideal driving conditions with no wheel slippage, approximately one-third of the total torque of the engine is distributed to the forward traction wheels and two-thirds of the total torque is distributed to the rear traction wheels.

A traction differential assembly is associated with the planetary gearing to effect a change in the torque split ratio when driving conditions demand that they change. This control is achieved by a clutch that is under computer supervision to initiate driveshaft lockup and release, thereby controlling wheel slippage and improving handling and control of the vehicle.

As in the case of the transmission T-drive assemblies of my copending applications, my present invention makes it possible for the vehicle to reduce the vehicle forward profile height to a minimum and to reduce or eliminate the intrusion of the transmission into the passenger compartment. The low profile of the hood and the cowl of the vehicle that is made possible by my improved transmission design increases design flexibility.

According to one embodiment of my invention, the profile of the hood and the cowl of the vehicle may be reduced even further by providing a hypoid gear arrangement of the cross-axis gear and pinion located at the midpoint of the engine crankshaft. The transmission may be lowered by an additional amount that is equal to the amount of the offset between the axes of the transmission gear and the meshing right angle bevel gear in the hypoid cross-axis gearing.

According to one embodiment of my invention, the transaxle includes a hydrokinetic torque converter that is located between the engine and the right angle drive that distributes torque from the torque output element of the gearing to the axle half shafts.

According to a second embodiment of my invention, the transaxle includes a hydrokinetic torque converter located between the right angle drive and the planetary elements of the transaxle.

Each of these configurations is described, as well as their respective advantages, in my present disclosure and in my copending applications identified above.

BRIEF DESCRIPTION OF THE DRAWINGS

FIG. 14 is a cross-sectional view of the hypoid gearing of FIG. 13 as seen from the plane of section line 14-14 of FIG. 13.

PARTICULAR DESCRIPTION OF THE INVENTION

Figure 2:
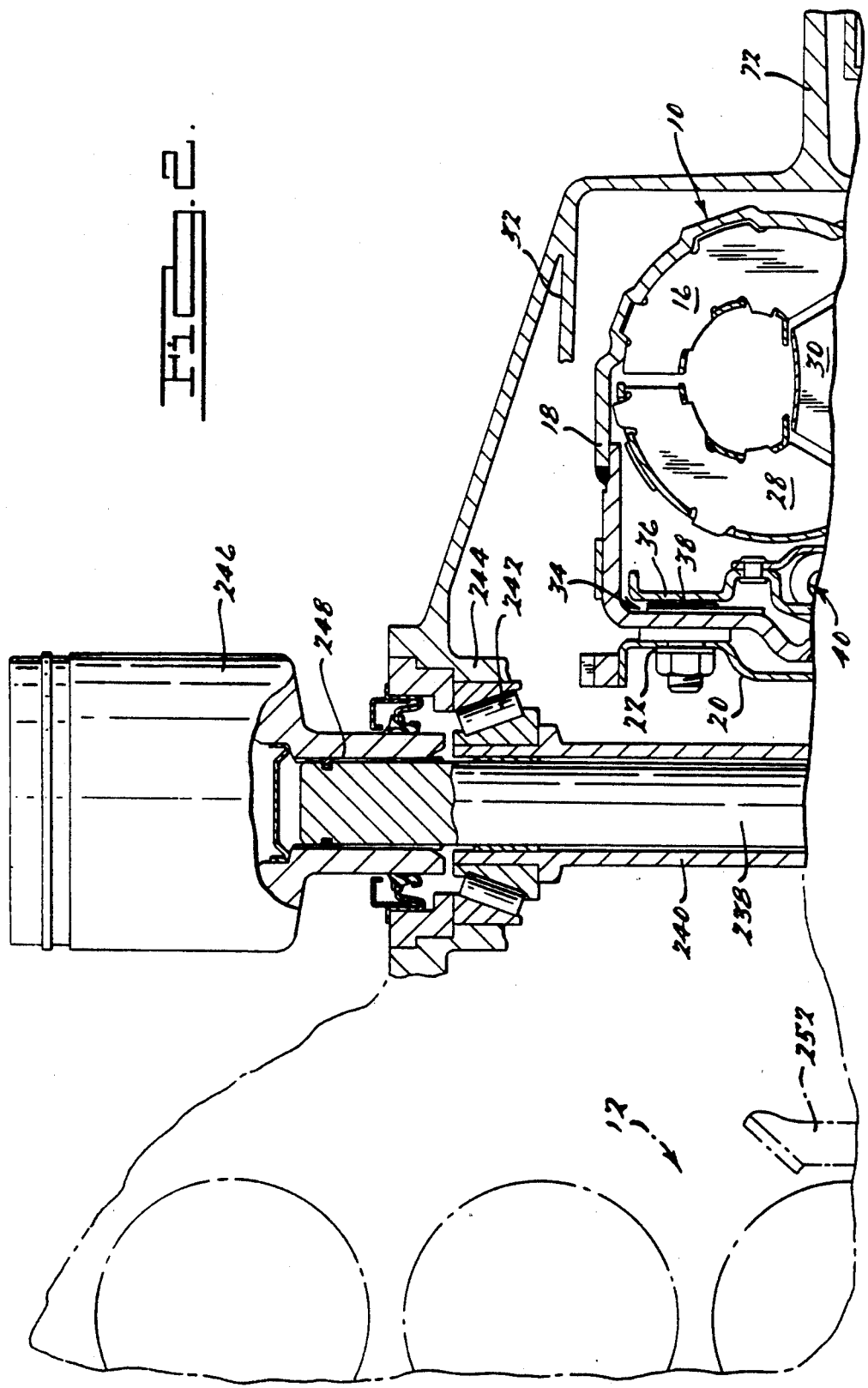
FIGS. 2-8, taken together, show a second embodiment of my invention wherein the right angle drive for the axle half shafts is located between the engine and the hydrokinetic torque converter.
Figure 3:
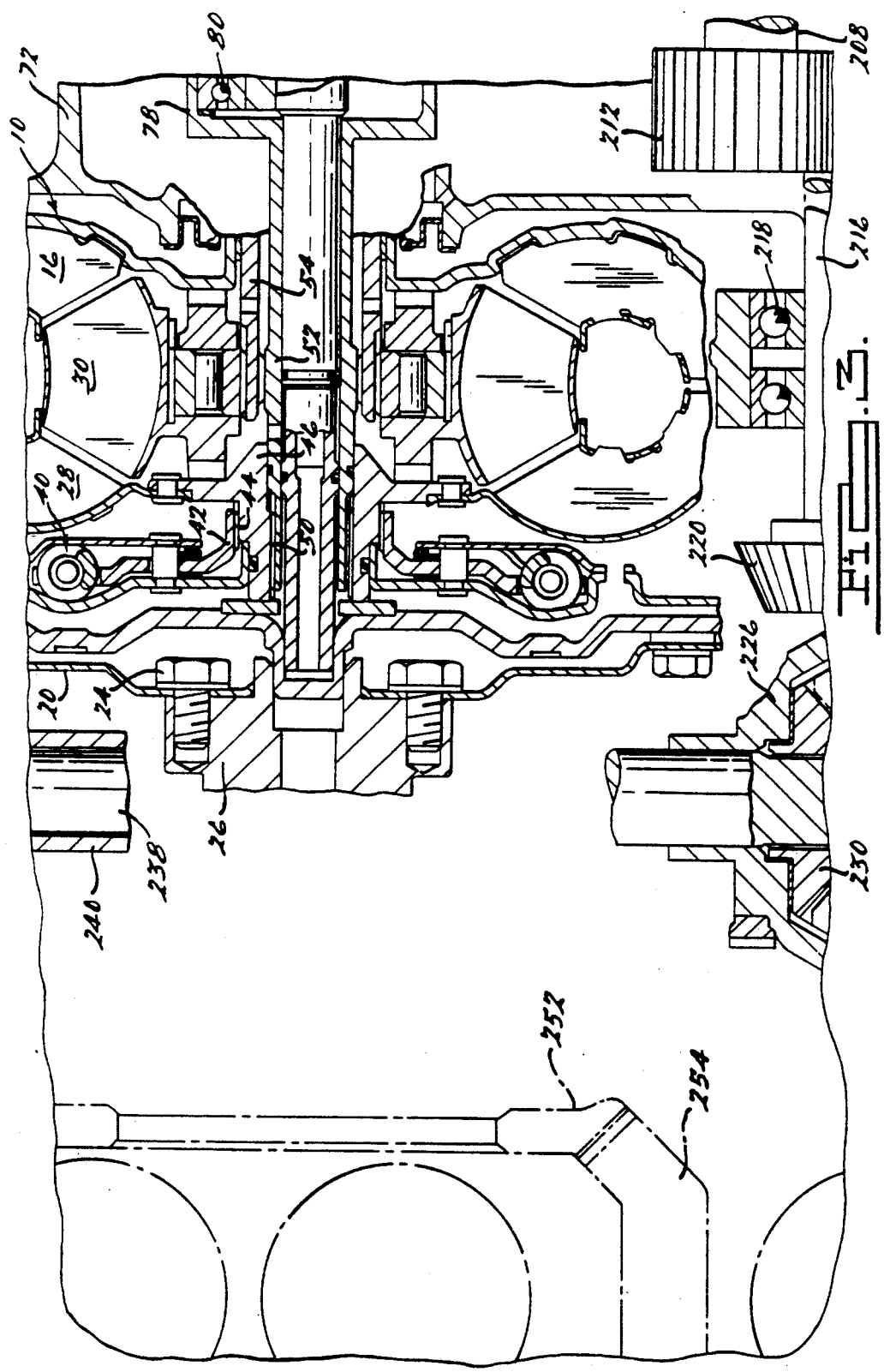
Figure 7:
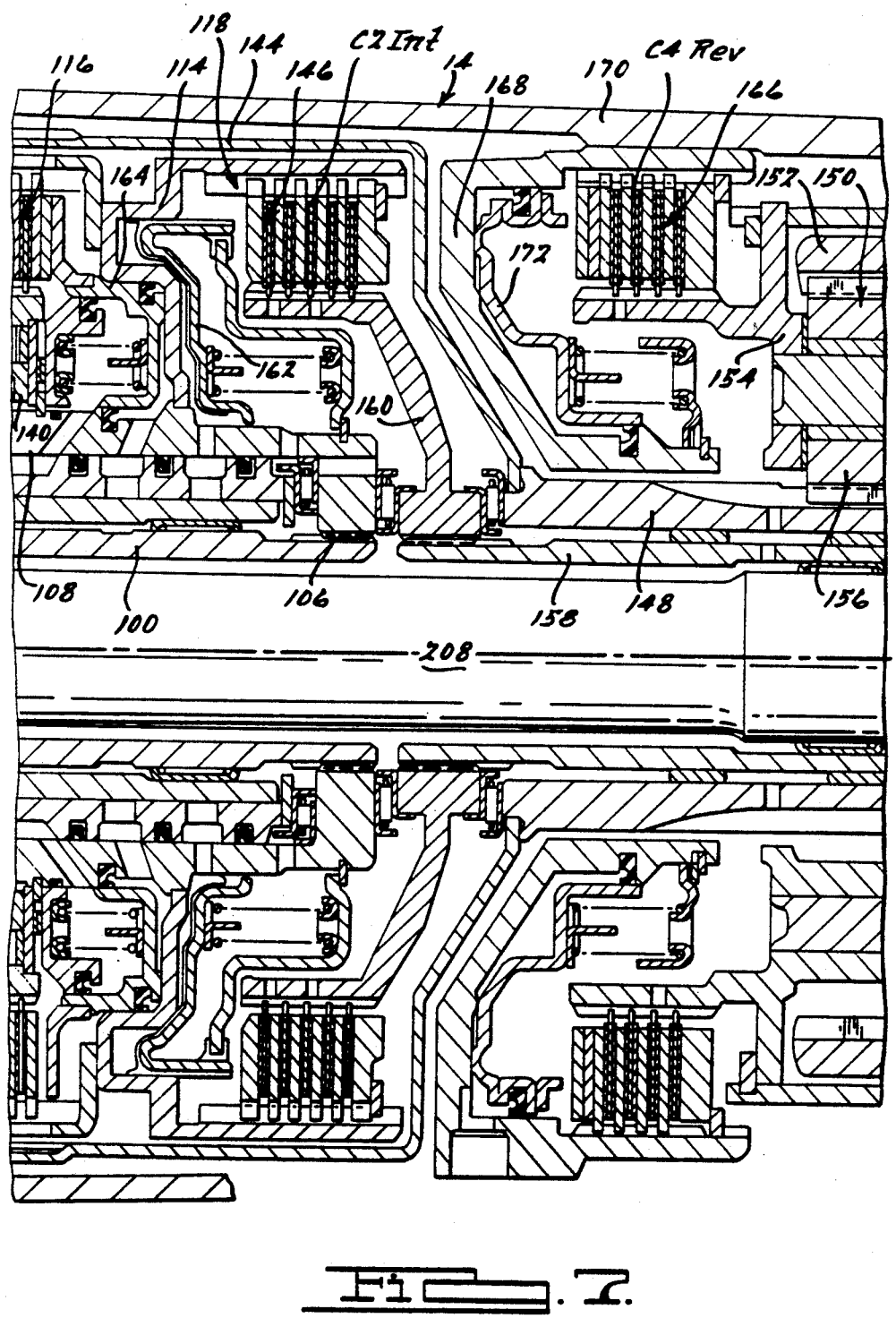

In FIGS. 2 and 3, reference numeral 10 designates a hydrokinetic torque converter which is disposed in a torque transfer path between an internal combustion engine, schematically shown at 12 in FIG. 2, and multiple ratio gearing for a planetary transmission designated generally by reference character 14 in FIG. 7.

In FIGS. 2 and 3, the impeller of the torque converter 10 is a bladed toroidal fluid flow member 16 having an impeller housing 18. A drive plate 20 is bolted at its outer periphery to the radially outward portion of the impeller housing 18 as shown at 22. A radially inward portion of the drive plate 20 is bolted at 24 to transmission input drive shaft 26, the axis of which is situated perpendicularly with respect to the axis of the crankshaft of the engine 12.

The torque converter 10 includes a turbine 28 and a bladed stator 30 located between the flow exit section of the turbine 28 and the flow entrance section of the impeller 16. Torque converter 10 is situated in a transmission housing portion 32, which is bolted to the engine cylinder housing.

Impeller housing 18, which is located within the transmission housing portion 32, encloses a lockup clutch disc assembly 34 having annular friction surface 36 situated adjacent an annular clutch plate 38 secured to the inner wall of the housing 18. A damper assembly 40 establishes a resilient connection between the clutch disc assembly 34 and clutch plate hub 42, which is splined at 44 to turbine hub 46. Hub 46, in turn, is splined at 50 to turbine sleeve shaft 52.

The converter 10 multiplies torque delivered to the impeller 16. When the speed ratio is high, turbine torque developed by the converter is transferred directly to the turbine sleeve shaft 52. When the lockup clutch is applied, a frictional driving connection is established between friction disc 38 and clutch disc 34. The torque applied to the clutch disc 34 is transferred through tangentially mounted springs of the damper assembly 40 to the clutch plate hub 42 which, as explained, is splined to the turbine hub. This establishes a bypass torque flow path around the hydrokinetic torque flow path of the torque converter 10.

Stator 30 is mounted on stator sleeve shaft 54, and overrunning brake 56 establishes a torque reaction for the stator 30 during operation of the converter in the torque multiplication mode and accommodates freewheeling motion of the stator 30 in the direction of motion of the impeller and the turbine when the torque converter 10 achieves a high speed ratio coupling point.

Figure 5:
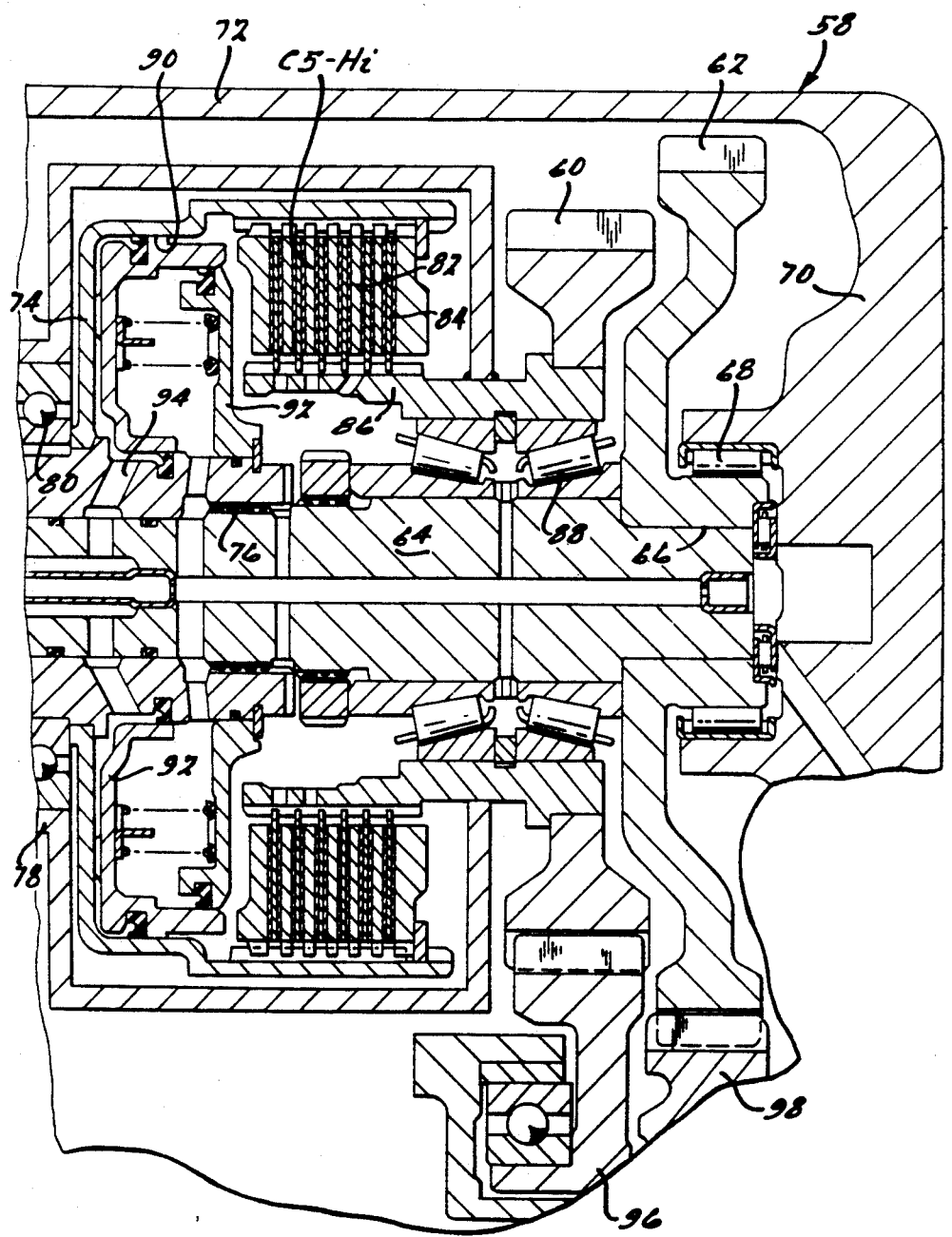

A two-speed torque transfer drive mechanism is shown at 58 in FIG. 5. This includes a first torque transfer gear 60 and a large pitch diameter torque transfer gear 62 which are mounted on drive shaft 64. Large diameter gear 62 is secured at 66 to the drive shaft 64 and is journalled at 68 to end wall 70 of housing portion 72.

Clutch housing 74 is splined at 76 to the shaft 64, which drives gear 62. Clutch housing 74 is journalled on member 78 by bearing 80. Member 78 is connected to turbine sleeve shaft 52 as seen in FIG. 3. Externally splined clutch discs of a multiple disc clutch assembly 82 are carried by the clutch housing 74 and cooperate with internally splined friction discs 84 secured to clutch member 86. Member 86 is secured to the gear 60, the latter being journalled by tapered roller thrust bearings 88 on shaft 64 as seen in FIG. 5.

Clutch housing 74 defines an annular cylinder 90 in which is positioned clutch piston 92 which cooperates with cylinder 90 to define a pressure chamber. When fluid pressure is supplied to the pressure chamber through radial passage 94, a hydrostatic force is applied to the piston which engages the friction clutch assembly, thus connecting the shaft 78 to the gear 62.

Gears 60 and 62 mesh, respectively, with gears 96 and 98. Gear 98 is connected directly to torque input shaft 100 for the planetary gear system. An overrunning coupling in the form of a roller clutch is disposed between gear 98 and hub 102, the overrunning coupling being designated by reference numeral 104 as well as the symbol OWC3.

Figure 6:
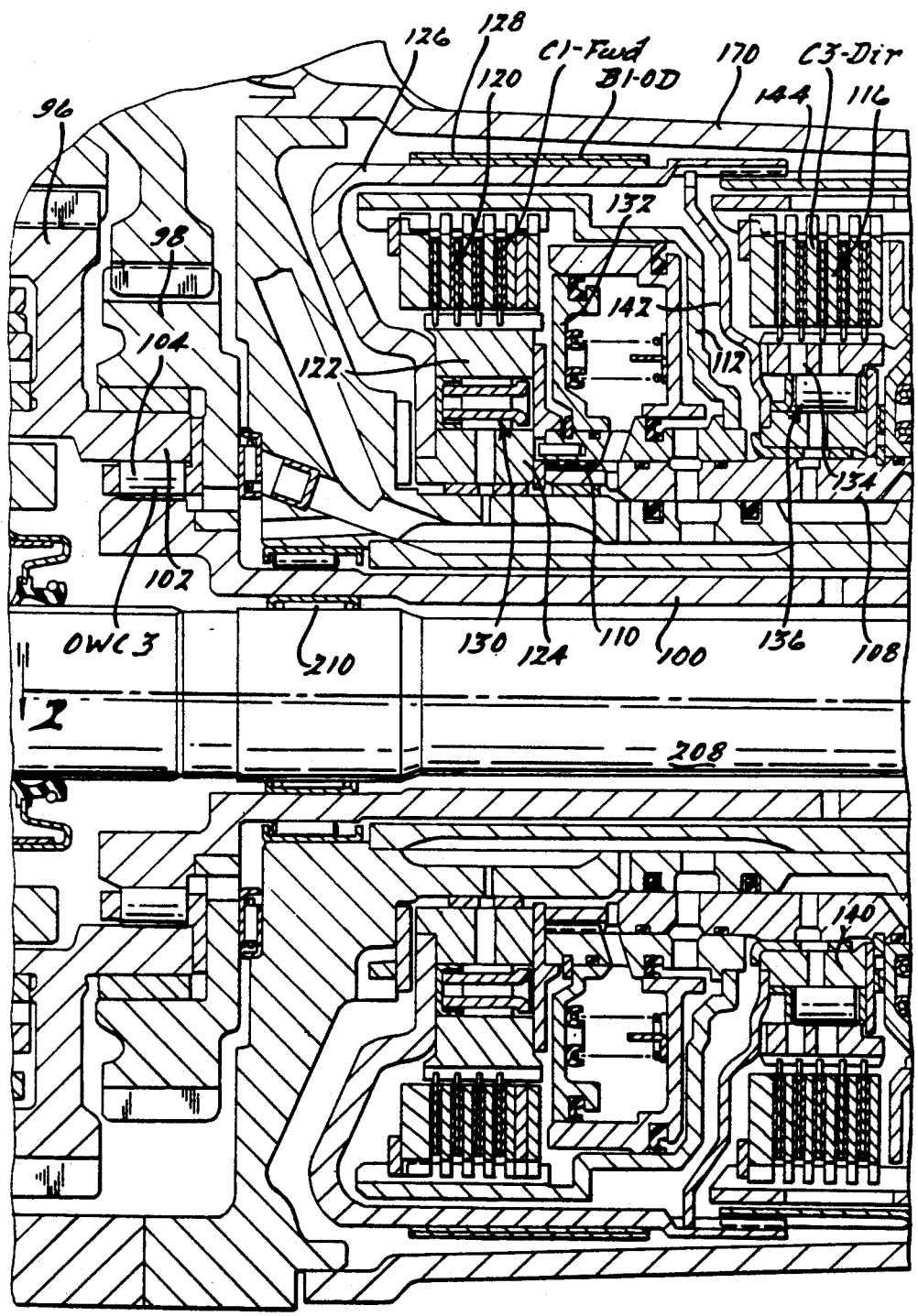
Figure 8:
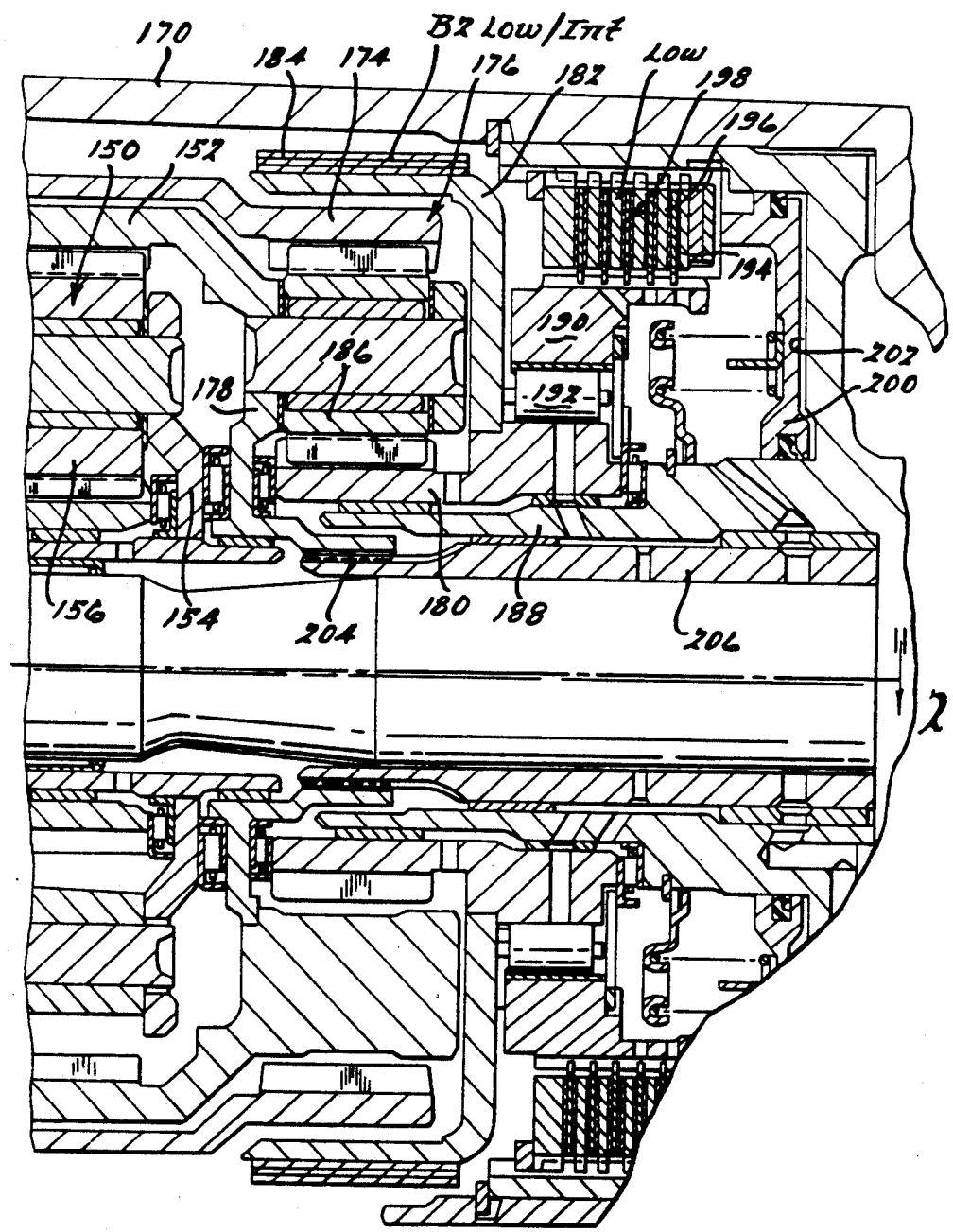

The planetary gear system shown in FIGS. 6, 7 and 8 is based upon the planetary gear system shown in U.S. Pat. No. 4,509,389. Reference may be made to that patent for the purpose of supplementing this disclosure in order to assist in understanding the mode of operation of the planetary elements of the gear system shown in FIGS. 6, 7 and 8.

Torque input sleeve shaft 100 in FIGS. 6, 7 and 8 is splined at 106 to clutch sleeve shaft 108. Sleeve shaft 108 is splined at 110 to forward clutch cylinder 112 and is connected directly also to cylinder housing 114 for direct clutch 116. Housing 114 serves as a cylinder housing also for intermediate clutch 118.

The forward clutch, which is designated generally by reference character 120, comprises discs carried by the clutch housing 112 and companion discs carried by overrunning clutch race 122. The companion inner race 124 is secured to brake drum 126, which is adapted to be anchored by friction brake band 128. Overrunning clutch races 122 and 124 form a part of an overrunning clutch assembly generally designated by reference character 130.

The friction discs of the forward clutch 120 are engaged as pressure is distributed behind annular piston 132 disposed in a cylinder defined by the cylinder housing 112.

The direct clutch 116 comprises friction discs carried by the clutch housing 114 and cooperating friction discs carried by outer overrunning clutch race 134, which forms a part of overrunning coupling 136. The inner race 140 of the overrunning clutch 136 is connected by means of clutch member 142 to the brake drum 126.

Torque transfer member 144, seen in FIGS. 6 and 7, extends axially and surrounds intermediate clutch 146 and distributes torque to sun gear 148. Sun gear 148 forms a part of a first planetary gear unit 150 which includes also a ring gear 152, carrier 154 and planet pinions 156 carried by the carrier 154 in meshing engagement with the ring gear 152 and the sun gear 148. Carrier 154 is secured to sleeve shaft 158 which is splined to clutch member 160 of the intermediate clutch 146. The clutch 146 includes friction discs carried at its outer periphery. These discs register with clutch discs carried by the cylinder housing 114.

Housing 114 defines an intermediate clutch cylinder which receives annular piston 162. When the pressure chamber defined in part by the piston 162 is pressurized, the piston engages the friction discs of the clutch 146. Similarly, cylinder member 114 defines an annular cylinder that receives annular piston 164. When pressure is admitted to the pressure chamber partly defined by the piston 164, the clutch discs of the direct clutch assembly 116 are frictionally engaged.

Carrier 154 of the planetary gear unit 150 is adapted to be braked by brake disc assembly 166. Brake disc assembly 166 is engaged during reverse drive. It is defined in part by brake cylinder 168 secured to the transmission housing portion 170. Brake cylinder 168 receives annular brake piston 172, which defines a pressure chamber that may be pressurized to effect frictional engagement of the discs of the brake assembly 166.

Carrier 154 is connected drivably to ring gear 174 of the second simple planetary gear unit 176. Ring gear 152 of gear unit 150, shown in FIGS. 7 and 8, is connected directly to carrier 178 of the gear unit 176. Sun gear 180 of gear unit 176 is connected to brake drum 182, which is adapted to be anchored by brake band 184 during low and intermediate speed ratio operations. Pinions 186 are carried by carrier 178 in meshing engagement with the ring gear 174 and sun gear 180. Sun gear 174 is journalled on support sleeve shaft 188 and is adapted to be connected to brake member 190 through overrunning brake 192.

Brake member 190 carries low speed ratio friction brake discs 194 which cooperate with friction brake discs 196 for a low speed ratio friction brake identified generally by reference character 198. A low speed ratio brake piston 200 is received in brake cylinder 202 formed at one end of the transmission housing 170. When the pressure chamber defined in part by the piston 200 is pressurized, the low speed ratio brake 198 is energized, thus anchoring the sun gear 180.

Figure 4:
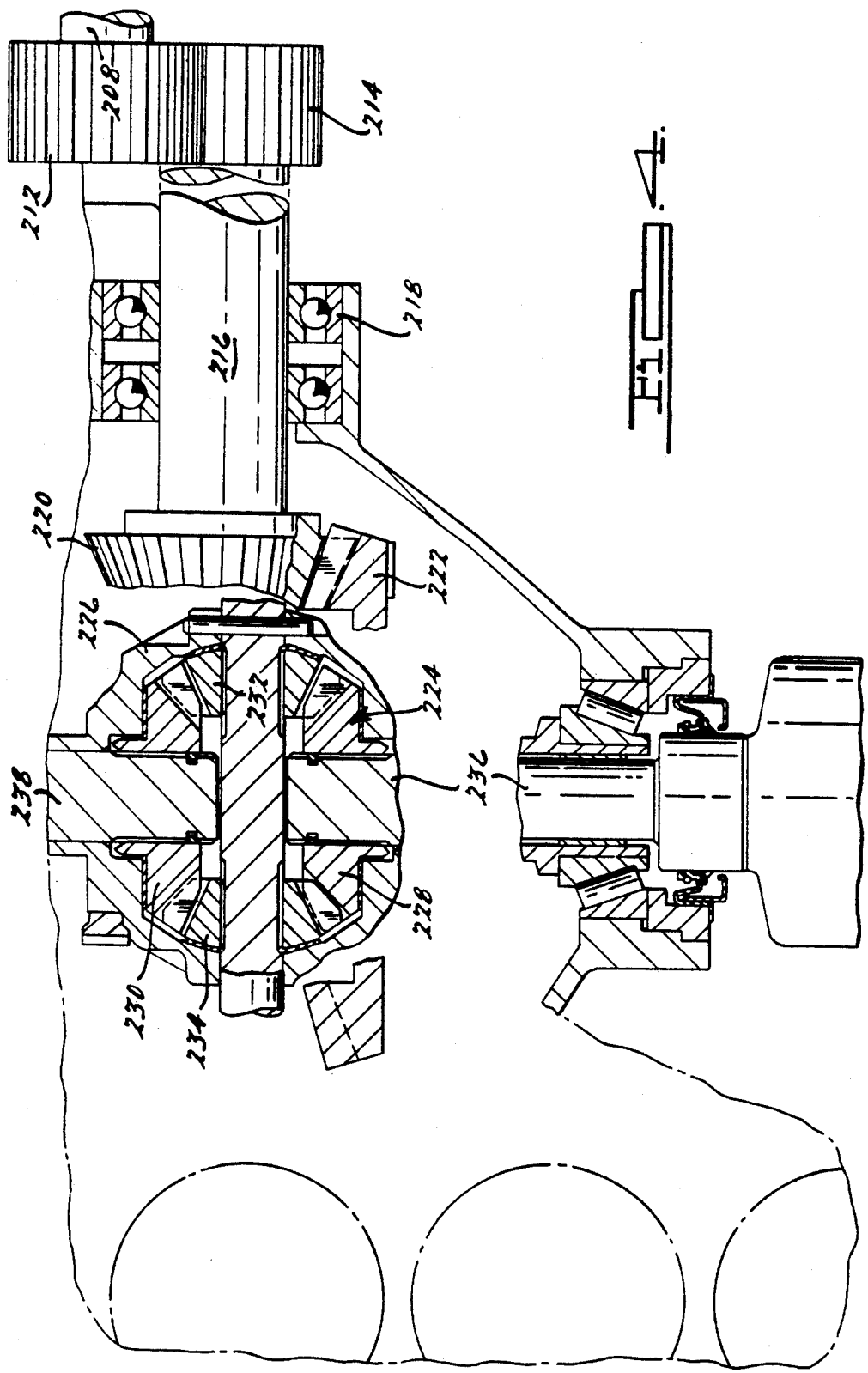

Carrier 178 is splined at 204 to sleeve 206, which in turn is connected directly to power output shaft 208 extending through the planetary gear units and the transmission clutch and brake assemblies. The left end of output shaft 208, as seen in FIGS. 3 and 4, is journalled by needle bearing assembly 210, seen in FIG. 6. The left end of shaft 208 carries power output gear 212 which meshes with output gear 214 mounted on shaft 216.

Shaft 216 is journalled in bearing assembly 218 and is adapted to rotate on an axis that is offset sufficiently from the axis of the torque converter to avoid interference with the impeller housing 18. The left end of the shaft 216 carries output bevel gear 220, which engages drivably ring gear 222 of a front axle differential assembly 224. Bevel ring gear 222 is carried by differential housing 226 which encloses differential side gears 228 and 230. These mesh with spaced differential pinions 232 and 234. Side gear 228 is splined to a first axle half shaft 236, and side gear 230 is splined to a companion axle half shaft 238. Half shaft 238 extends through sleeve shaft 240 in a direction transverse to the axis of the torque converter and is located between the engine 12 and the drive plate 20 of the torque converter.

The outboard end of the sleeve 240 is journalled by bearing 242 in bearing support 244 carried by the transmission housing. One front traction wheel for the vehicle is connected by means of the universal joint, schematically illustrated at 246 in FIG. 2, to the outboard end of the shaft 238, a splined connection 248 being provided for this purpose.

Shafts 236 and 238 are journalled in their respective sleeve shafts by suitable bushings. A drive plate 20 of the torque converter, as mentioned previously, is connected to the torque input shaft shown at 26 in FIG. 3. A torque input bevel gear 252 connected to the shaft 26 meshes with crankshaft gear 254, shown schematically in FIGS. 2 and 3.

In the embodiment of FIGS. 2 through 8, the engine has eight cylinders, as schematically illustrated, but the principles of my invention can be applied also to engines having fewer or more cylinders. Gear 254 is located at the crankshaft center with four cylinders on one side thereof and four cylinders on the opposite side thereof. Crankshaft gear 254 has an axis that coincides with the axis of the crankshaft. It meshes with the gear 252 to form a right angle drive as illustrated. Thus, the offset of the axes of the torque converter and the planetary gearing makes it possible for the gear 254 to be located directly on the center of the crankshaft. This is in contrast to the arrangement shown in my copending application Ser. No. 471,759 where the axis of the torque input gear for the torque converter is located at the center of the crankshaft axis and the right angle crankshaft gear with which it meshes is offset on the crankshaft an amount equal to the pitch radius of the torque input bevel gear. The location of gear 254 coincides with the nodal point for the first natural torsional frequency. The nodal point is established by the rotary inertia effect of the impeller housing of the torque converter and the other rotary members between the torque input bevel gear and the transmission gearing.

Figure 9:
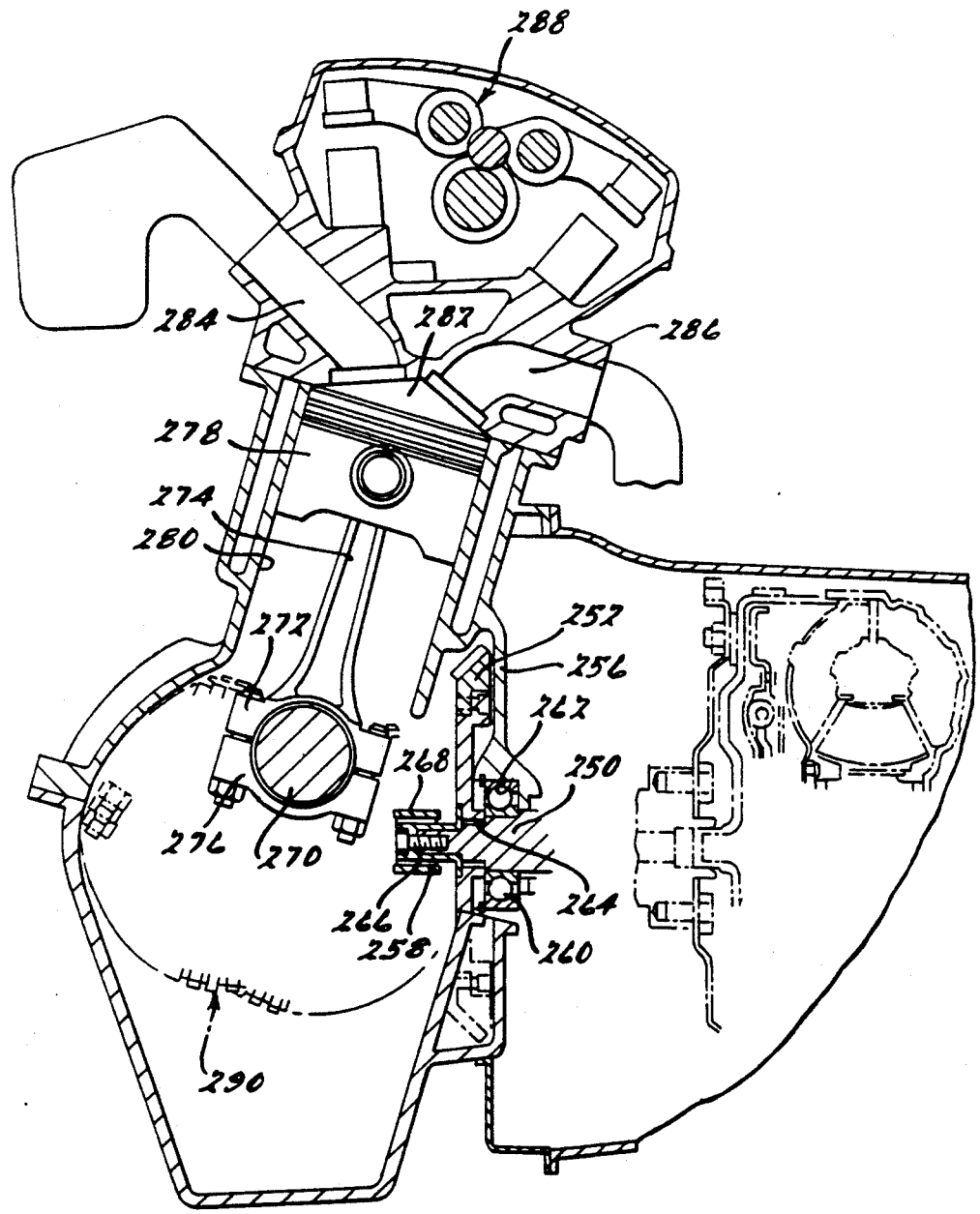
FIG. 9 is a longitudinal cross-sectional view taken along a vertical plane containing the axis of the transmission gearing and hydrokinetic torque converter and showing details of the bevel gear drive between the engine crankshaft gear and the transmission torque input elements, the plane of the sectional view of FIG. 9 being at a right angle with respect to the plane of the sectional views of FIGS. 2, 3 and 4.

In FIG. 9, we have shown in generally schematic cross-sectional form the relationship of the gear 252 to the crankshaft. When the gear is assembled in this embodiment, the gear 252 is straddle mounted in the transmission housing wall 256. Straddle-mounted bearings, shown at 258 and 260, are situated on opposite sides of the gear 252. Bearing 260 is located in a bearing opening 262 in the engine housing wall 256. The hub of gear 252 is splined at 264 to the shaft 250, the inboard end 266 of the shaft 250 being supported by the bearing 258, which is located in a bearing opening formed in engine housing boss 268.

The crankshaft is comprised of crank portions, one of which is shown in FIG. 9 at 270. One end 272 of a piston rod 274 is secured to the crank portion 270 by a crankshaft bearing cap 276. Engine piston 278, which is connected to the piston rod 274, reciprocates in engine cylinder 280, thus creating a combustion chamber of variable volume as shown at 282. Valve ports 284 and 286 communicate with the engine combustion chamber in known fashion. The flow of air/fuel mixture to the combustion chamber and the flow of exhaust gases from the combustion chamber is accommodated by the intake and exhaust ports that register with their respective port openings. Valve operating camshaft and rocker arm assemblies 288 control the operation of the valves (not shown).

The circular path followed by the crankshaft end of the piston rod 274 is illustrated schematically by the family of crankshaft positions illustrated generally in FIG. 9 by reference character 290.

Figures 10, 11:
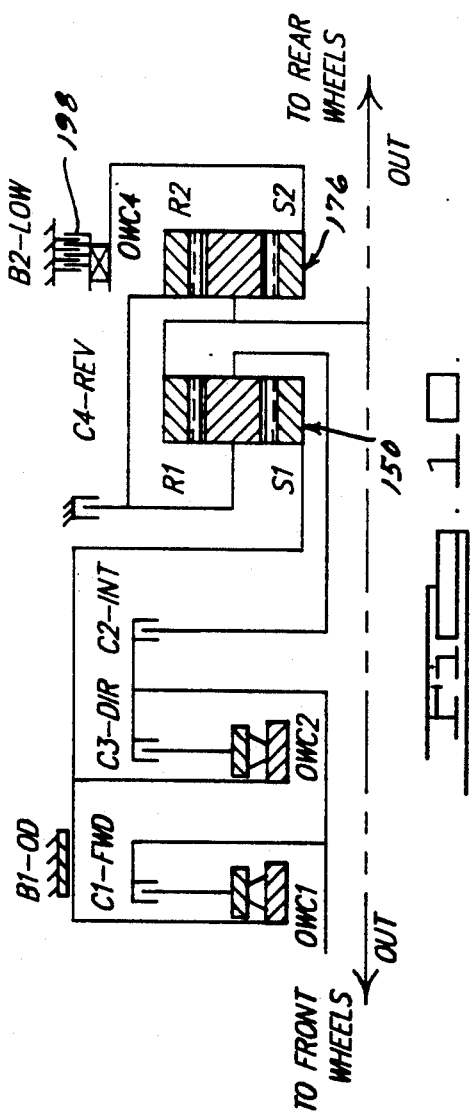
FIG. 10 is a schematic representation of the gearing and the clutches and brakes of the transmission mechanism of FIGS. 6, 7 and 8.
FIG. 11 is a chart that shows the clutch and brake engagement and release pattern for the clutches and brakes illustrated schematically in FIG. 10.

FIG. 10 is a line diagram that shows the clutches and the planetary elements of the gearing in schematic form. This is done to facilitate an understanding of the mode of operation of the gearing. In the schematic representation of FIG. 10, the ring gear for planetary gear unit 150 as designated by the symbol R1 and the sun gear is designated by the symbol S1. Similarly, the ring gear and the sun gear for gear unit 176 are designated by the reference symbols R2 and S2, respectively. Clutches 104, 130 and 136 are designated respectively by the symbols OWC3, OWC1 and OWC2.

Two output shafts are shown in FIG. 10, one extending to the front axles and the second to the rear axles. The second output shaft adapts the transmission for all-wheel drive vehicles.

During forward drive operation, the clutch shown in part at 82 is disengaged. The turbine torque then is delivered directly to the gear 60 through member 78. The torque is transferred then from gear 60 through the overrunning clutch OWC3 to the torque input shaft 100 for the planetary gearing. Clutch C is applied as it is during operation in each of the first four forward driving ratios. Overrunning brake 192, which also carries designation OWC4, and the brake 198 provide a torque reaction for the sun gear S2, which serves as a reaction element during low speed ratio operation. To effect a ratio change to the second ratio from the low speed ratio, clutch C2 is applied together with clutch C1. Although clutch C1 remains applied, torque is not transferred through it since overrunning clutch OWC1 freewheels as torque is transferred directly from the shaft 100 through the engaged clutch C2 to the carrier for the planetary gear unit 150. This drives ring gear R2 for the gear unit 176. With sun gear S2 acting as a reaction point, output shaft 208 is driven with an increased ratio.

Third speed ratio operation is achieved by engaging simultaneously clutches C1, C2 and the clutch C5, shown in part at 82 in FIG. 5. This causes turbine torque to be delivered to gear 68 which drives input gear 98 which is connected directly to the input shaft 100. Under these conditions, overrunning clutch OWC3 free wheels.

A fourth speed ratio is achieved by engaging simultaneously the clutches C1, C2 and C3. This effects a 1:1 ratio in the gear units 150 and 176 as the gear 98 continues to serve as a torque input gear.

Clutch C1 is released and the overdrive brake 128, which is designated by the symbol B1 in FIG. 6, is applied. This anchors sun gear S1 for the planetary gear unit 150. The ring gear R1 then is overdriven, which overdrives the output shaft 208.

Reverse drive is obtained by engaging simultaneously brake C4 (also identified as brake 166 in FIG. 7), the latter anchoring the carrier as sun gear S1 serves as a torque input element. Ring gear R1 then is driven in a reverse direction which drives the output shaft 208 is a reverse direction.

The clutch and brake engagement and release pattern is shown in FIG. 11. Reference may be made to it as well as to the schematic line diagram of FIG. 10 to understand the operation of the planetary elements in each of the ratios.

Figure 12:
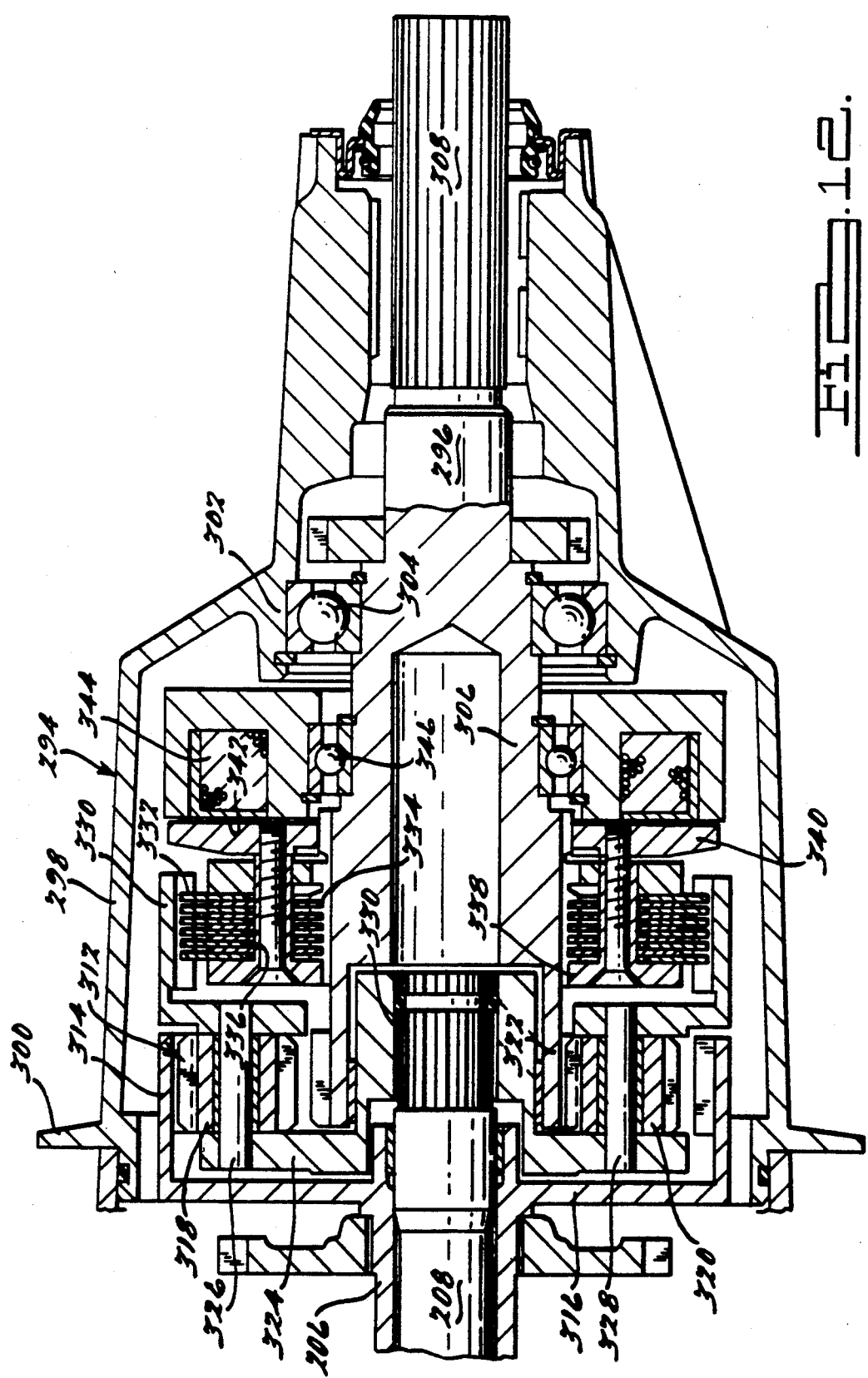
FIG. 12 is a cross-sectional view of the differential gearing situated at the torque output side of the transmission planetary gearing of FIGS. 6, 7 and 8 and which is adapted to distribute torque to the front traction wheels as well as to the rear traction wheels.

FIG. 12 shows at 294 a rear differential gear assembly which is adapted to establish a torque flow path between the shaft 208 and the torque output sleeve shaft 206 and between the rear wheel drive shaft 296 and the torque output sleeve shaft 206. The differential gear assembly of 294 comprises a housing 298 that is adapted to be bolted or otherwise secured at its left-hand margin 300 to the right end of the transmission housing 170.

The differential housing 298 has a bearing support 302 at its right-hand end which supports ball bearing 304. Differential torque output shaft 306 is journalled in the bearing 304 and is connected to axle drive shaft 308. Sleeve shaft 310, which forms a part of the axle half shaft, is splined to the shaft 308.

A differential compound planet gear assembly 312 has a ring gear 314 connected by means of radial member 316 to the sleeve shaft 206. A first set of planet pinions 318 meshes with ring gear 314. A second set of planet pinions 320 meshes with the planet pinions 318 and with sun gear 322. Pinions 318 mesh with pinions 320. Each set of pinions 318 and 320 is journalled on carrier 324 by means of pinion shafts shown respectively at 326 and 328. Carrier 324 is splined at 330 to the shaft 208.

The carrier 324 is connected directly to clutch drum 332 which is formed with axial slots or splines that register with external slots or splines in friction discs 332. These discs 332 register with discs 334 in interdigital frictional relationship. Discs 334 are carried by armature member 336 which extends axially and which is formed with pressure plate 338. Armature member 336 is secured to member 340 situated directly adjacent an electromagnetic clutch housing 342. An electromagnetic coil winding 344 is disposed in housing 342 and is journalled by bearing 346 on the shaft 306.

When the electromagnetic coil winding 344 is not energized, the friction discs 332 are free to move relative to the friction disc 334. Torque delivered from shaft 206 then is transferred directly to the ring gear 314. The torque then is split into each of two torque delivery paths, one of which includes carrier 324 and the other of which includes the sun gear 322. ? art of the torque delivered to the shaft 306 is distributed to the shaft 208 which extends to the front vehicle wheels, and part is delivered to output shaft 208. In a typical embodiment of the invention, one-third of the torque would be distributed to the front wheels and two-thirds to the rear wheels.

If either the front wheels or the rear wheels should slip, the resulting change in the angular velocity of the slipping wheel will be detected by a vehicle wheel speed sensor whereupon a microprocessor (not shown)

would deliver a signal to a power supply for the electromagnetic clutch winding 344. The magnitude of the current delivered to the winding 344 is proportional to the slip rate. Thus, the armature 340 of the electromagnetic clutch will engage the friction discs 322 and 344, which resist relative movement of the sun gear 332 with respect to the ring gear 314. Thus, there is a partial drive shaft lockup and release under computer supervision.

If the slip sensor detects slip of a traction wheel by measuring an abnormal increase in the speed of rotation of the slipping wheel, the drive shaft of the wheel will be locked to the non-slipping wheel for a few microseconds. In the normal background control loop in the microprocessor, a check then is made to determine whether slip still exists. If it does, the shafts then are locked again and the cycle is repeated until normal four-wheel traction is achieved.

Figure 1:
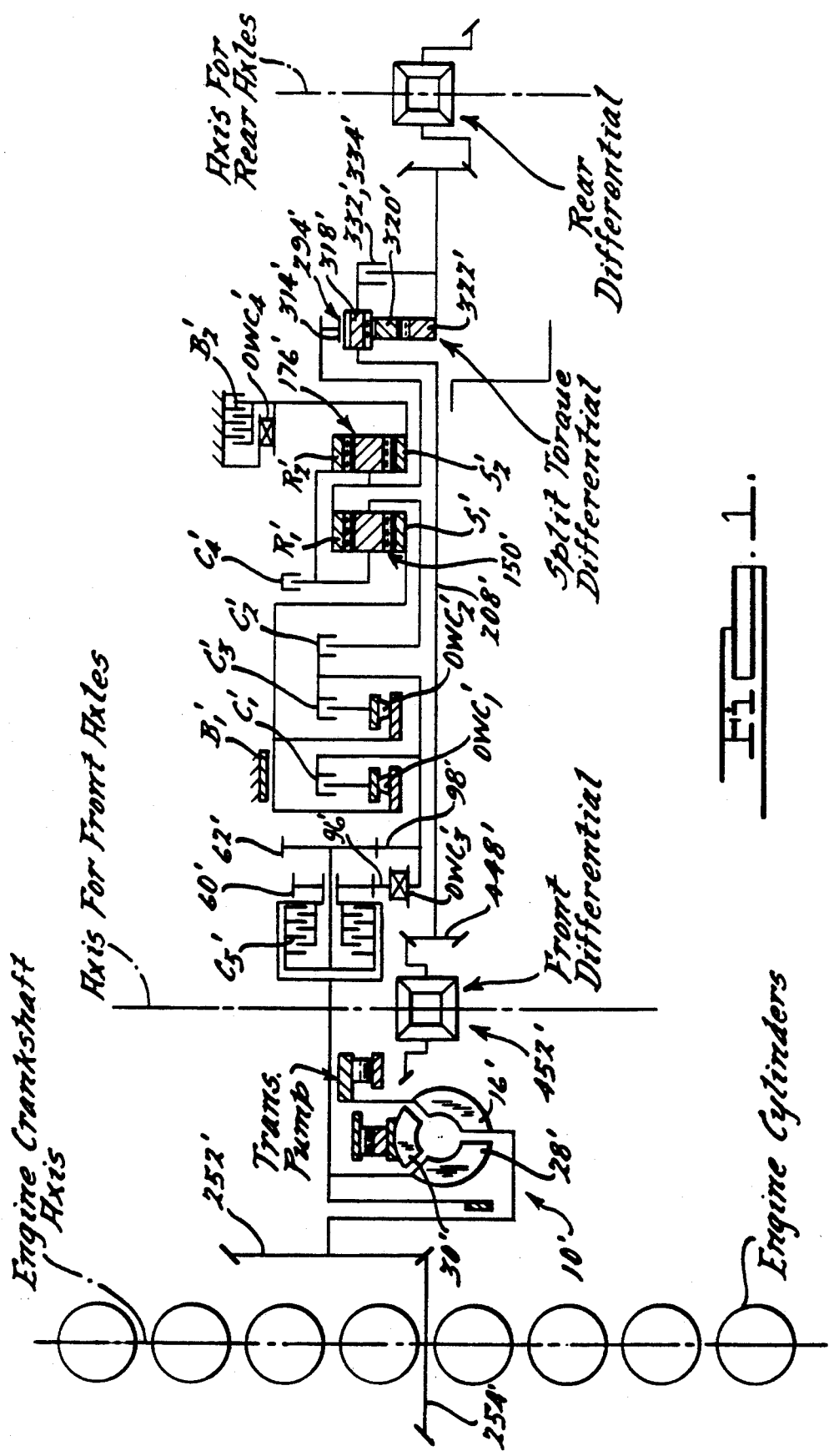
FIG. 1 is a schematic representation of a T-drive assembly embodying features of my invention in which the hydrokinetic torque converter is located between the engine and the right angle drive for the axle half shafts.

Referring next to FIG. 1, I have shown an embodiment of my invention in which the rear differential is adapted to deliver torque to the rear traction wheels and a portion of the driving torque is delivered to the front traction wheels through the shaft 208', which corresponds to the shaft 208 of the embodiment of FIGS. 2 through 8. The drive pinion drives the front differential axle gearing as shown in FIG. 1 at 448'. This pinion corresponds to the pinion 448 shown in FIG. 8B. Pinion 448' in FIG. 1 drives a differential assembly 442' which corresponds to the differential assembly 452 in FIG. 8B.

The embodiment of FIG. 1 differs from the previously described embodiment because the torque converter shown generally at 10' in FIG. 1 is located between the engine crankshaft and the differential gearing 452'. In this respect, the embodiment of FIG. 1 is different than the embodiment previously described in which the torque converter 10, which corresponds to the torque converter 10' in FIG. 1, is located between the differential gearing and the drive pinion at the output side of the planetary gearing.

In the embodiment of FIG. 1, the crank-shaft gear 254' corresponds to the crankshaft gear 254 of the embodiment previously described. It meshes with gear 252' which corresponds to the gear 252 previously described. Gear 252' is connected directly to the impeller of the hydrokinetic torque converter 10'.

The other elements of the embodiment of FIG. 1 that have counterpart elements in the embodiment of FIGS. 2 through 8 are designated by similar reference characters, although prime notations are added. The function of these elements is the same as the function that is described for the counterpart elements.

Figure 13:
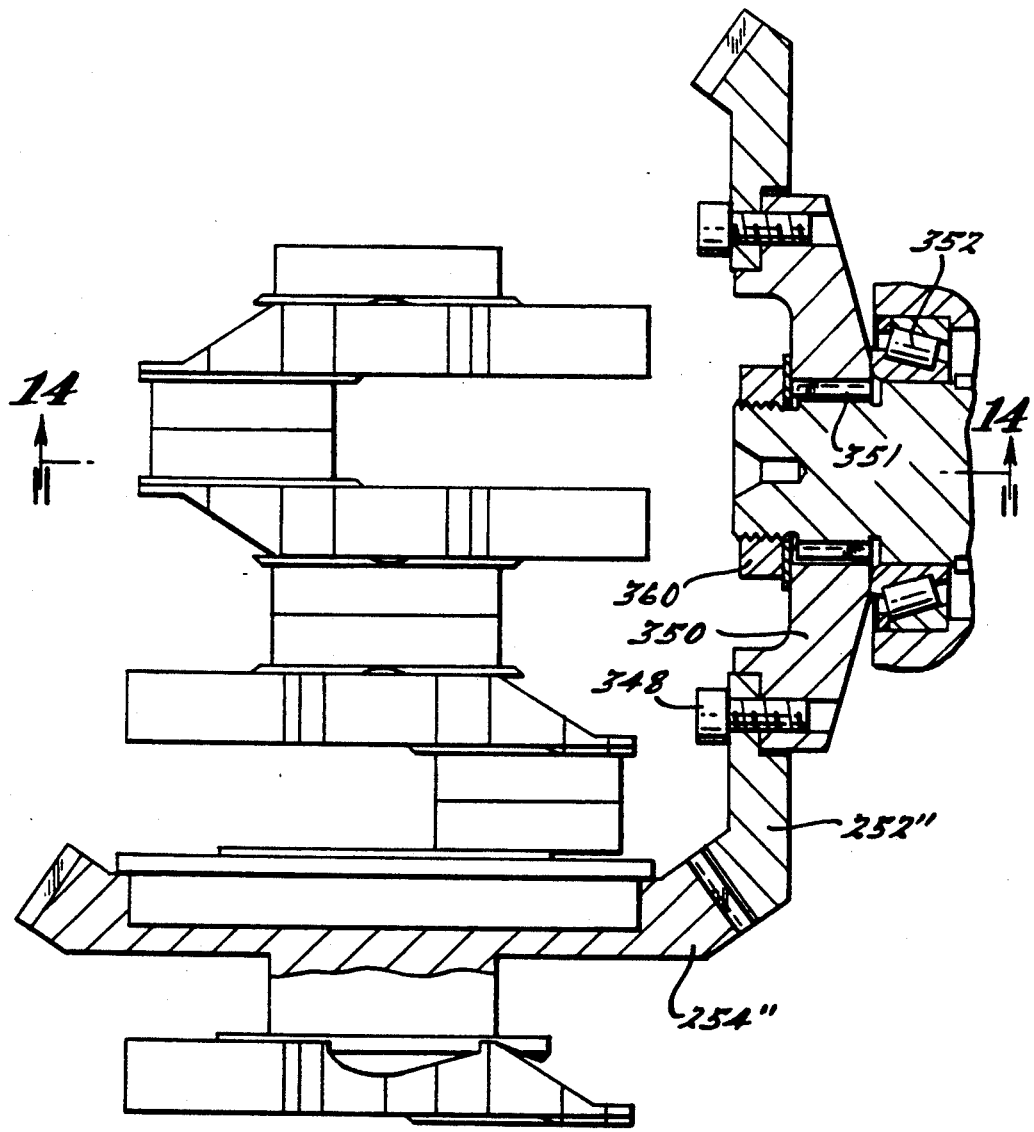
FIG. 13 is a partial cross-sectional view of a hypoid gearing arrangement for the cross-axis drive between the crankshaft gear and the torque input gear for the transmission mechanism. (This is an alternate construction which may be applied to either of the embodiments of the invention described above.)

FIGS. 13 and 14 show an alternate arrangement for mounting the crankshaft gear and the bevel gear with which the crankshaft gear meshes. The crankshaft gear is designated in FIG. 13 by reference character 254''. The bevel gear with which it meshes is designated by reference character 252''. The right angle gearing of FIG. 13 differs from the right angle gearing of the embodiments described previously because the gears 254'' and 252'' are hypoid bevel gears with axes that are offset, one in respect to the other. The offset is seen best in FIG. 14.

Gear 252'' is bolted or otherwise secured at 348 to gear hub 350, which is splined at 352 to the torque input shaft of the transaxle. This torque input shaft is designated, in the case of the embodiment previously described, at 26 in FIG. 3.

The gear hub 350 is journalled by tapered roller bearings 352 and 354 in bearing mounting plate support 356, which is secured in an opening (not shown) formed in the engine block. The support 356 is bolted at its periphery 358 to the periphery of the opening in the cylinder block.

Lock nut 360 holds the hub securely against the inner race of tapered roller bearing 352.

By using the hypoid bevel gearing shown in FIGS. 13 and 14, it is possible to lower the axis of the engine crankshaft an amount that is equal to the amount of the hypoid offset which is illustrated in FIG. 14. This reduces the height of the engine and makes it possible to lower the profile of the engine compartment and the cowling for the vehicle.

Having described preferred embodiments of my invention, what I claim and desired to secure by U.S. Letters Patent is:

1. A T-drive vehicle powertrain assembly for a vehicle having forward and rearward traction wheels comprising an internal combustion engine with a crankshaft, a drive gear connected to and rotatable in unison with said crankshaft about the axis of the crankshaft at a location intermediate the crankshaft ends;

a power transmission mechanism having a power input shaft mounted on an axis substantially perpendicular to said crankshaft axis, a power output shaft of said transmission being adapted to be connected to said forward traction wheels;

cross-axis gearing including said drive gear and a driving gear meshing with said drive gear; said transmission power output shaft extending toward said driving gear;

a final transaxle gear drive located between said engine and said transmission mechanism having differential gearing with axle drive gears for said forward traction wheels, a geared connection between said power output shaft and separate ones of said axle drive gears, each axle drive gear being adapted to be connected drivably to an axle shaft;

said crankshaft having multiple crank portions, said drive gear being mounted on one axial side of one of said crank portions, said driving gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driving gear and said one crank portion is avoided;

a hydrokinetic unit having a turbine and an impeller in toroidal fluid flow relationship, said hydrokinetic unit being located between said driving gear and said final transaxle gear drive, said driving gear being connected to said impeller and said turbine being connected to said power input shaft whereby said driving gear is drivably connected to said power input shaft, said engine and said transmission mechanism from a compact, unitary drive assembly; and a rear differential gear means for delivering torque from said power output shaft to said rearward traction wheels.

2. A powertrain for a wheeled vehicle having forward and rearward traction wheels comprising an internal combustion engine and a multiple ratio transmission, said engine and transmission including a common, multiple-part housing;

said engine having a crankshaft adapted to be mounted transversely with respect to a fore-and-aft geometric center plane for said vehicle;

said transmission having a power output shaft extending toward said crankshaft in a substantially perpendicular direction with respect to the axis of said crank-shaft; a final transaxle gear drive located between said engine and said transmission having differential gearing with axle drive gears for said forward traction wheels, a geared connection between power output portions of said transmission and separate ones of said axle drive gears, each axle drive gear being adapted to be connected drivably to an axle shaft;

cross-axis gearing including a bevel drive gear connected to and rotatable with said crankshaft at a position on said cranksahft intermediate its ends, and a bevel driven gear meshing with said bevel drive gear, said bevel driven gear being drivably connected to torque input portions of said transmission and being disposed substantially at a right angle with respect to said crankshaft;

said crankshaft having multiple crank portions, said drive gear being mounted on one axial side of one of said crank portions, said driven gear being mounted for rotation in the plane of motion of said one crank portion with its axis of rotation transversely dispósed with respect to said crankshaft axis, the pitch diameter of said drive gear being larger than the radial extent of the path of movement of said one crank portion whereby interference between said driven gear and said one crank portion is avoided;

a hydrokinetic unit having a turbine and an impeller in toroidal fluid flow relationship, said hydrokinetic unit being located between said bevel driven gear and said geared connection, said impeller being connected to said bevel driven gear and said turbine being connected to torque input portions of said transmission whereby said hydrokinetic unit forms a torque flow connection between said bevel drive gear and said torque input portions of said transmission, said bevel driven gear being disposed on an axis substantially at a right angle with respect to said crankshaft; and a rear differential gear means having differential gear elements for transferring torque from said transmission power output portions to said rearward traction wheels including differential gear clutch means adapted to connect together two of said differential gear elements for preventing a differential angular velocity of said forward and rearward traction wheels.

3. A T-drive for a vehicle having an internal combustion engine with a crankshaft axis disposed transversely with respect to a fore-and-aft vehicle geometric axis, said vehicle having forward traction wheels and rearward traction wheels;

a transmission having multiple ratio gearing, a power input shaft connected drivably to torque input portions of said multiple ratio gearing, a power output shaft drivably connected to power output portions of said gearing and adapted to transfer torque to said forward and rearward traction wheels;

cross-axis gearing drivably connecting said crankshaft to said torque input portions of said multiple ratio gearing comprising a drive gear connected directly to said crankshaft intermediate its ends and a driven gear engaging said drive gear;

a hydrokinet unit having a turbine and an impeller in toroidal fluid flow relationship, said impeller being drivably connected to said driven gear and said turbine being connected to said driven gear;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

said transmission power output shaft extending toward said driven gear and toward said rearward traction wheels; and a final transaxle gear drive located between said engine and said transmission having differential gearing with axle drive gears, a geared connection between said power output shaft and separate ones of said axle drive gears, each axle drive gear being adapted to be connected drivably to an axle shaft;

said drive gear and said driven gear being hypoid bevel gears wherein said power input shaft is displaced from said crankshaft axis an amount equal to the hypoid offset.

4. A T-drive for a vehicle having an internal combustion engine with a crankshaft axis disposed transversely with respect to a fore-and-aft vehicle geometric axis, said vehicle having forward traction wheels and rearward traction wheels;

a transmission having multiple ratio gearing, a power input shaft connected drivably to torque input portions of said multiple ratio gearing, a power output shaft drivably connected to power output portions of said gearing and adapted to transfer torque to said forward and rearward traction wheels;

cross-axis gearing drivably connecting said crankshaft to said torque input portions of said multiple ratio gearing comprising a drive gear connected directly to said crankshaft intermediate its ends and a driven gear engaging said drive gear;

a hydrokinetic unit having a turbine and an impeller in toroidal fluid flow relationship, said impeller being drivably connected to said driven gear and said turbine being connected to said driven gear;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

said transmission power output shaft extending toward said driven gear and toward said rearward traction wheels;

a final transaxle gear drive located between said engine and said transmission having differential gearing with axle drive gears, a geared connection between said power output shaft and separate ones of said axle drive gears, each axle drive gear being adapted to be connected drivably to an axle shaft;

said drive gear and said driven gear being hypoid bevel gears wherein said power input shaft is displaced from said crankshaft axis an amount equal to the hypoid offset; and a rear differential gear means for delivering torque from said power output shaft to said rearward traction wheels.

5. A powertrain for a wheeled vehicle having forward and rearward traction wheels comprising an internal combustion engine and a multiple ratio transmission, said engine and transmission including a common, multiple-part housing;

said engine having a crankshaft adapted to be mounted transversely with respect to a fore-and-aft geometric center plane for said vehicle;

said transmission having a power output shaft extending toward said crankshaft in a substantially perpendicular direction with respect to the axis of said crankshaft; a final transaxle gear drive located between said engine and said transmission having differential gearing with axle drive gears for said forward traction wheels, a geared connection between power output portions of said transmission and separate ones of said axle drive gears, each axle drive gear being adapted to be connected drivably to an axle shaft;

cross-axis gearing including a bevel drive gear connected to and rotatable with said crankshaft at a position on said crankshaft intermediate its ends, and a bevel driven gear meshing with said bevel drive gear, said bevel driven gear being drivably connected to torque input portions of said transmission and being disposed substantially at a right angle with respect to said crankshaft;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

a hydrokinetic unit having a turbine and an impeller in toroidal fluid flow relationship, said hydrokinetic unit being located between said final transaxle gear drive and said multiple ratio transmission, said impeller being connected to said bevel driven gear and said turbine being connected to torque input portions of said transmission whereby said hydrokinetic unit forms a torque flow connection between said bevel drive gear and said torque input portions of said transmission, said bevel driven gear being disposed on an axis substantially at a right angle with respect to said crankshaft; and a rear differential gear means having differential gear elements for transferring torque from said transmission power output portions to said rearward traction wheels including differential gear clutch means adapted to connect together two of said differential gear elements for preventing a differential angular velocity of said forward and rearward traction wheels.

6. A T-drive vehicle powertrain assembly for a vehicle having forward and rearward traction wheels comprising an internal combustion engine with a crankshaft, a drive gear connected to and rotatable in unison with said crankshaft about the axis of the crankshaft at a location intermediate the crankshaft ends;

a power transmission mechanism having a power input shaft mounted on an axis substantially perpendicular to said crankshaft axis, a power output shaft of said transmission being adapted to be connected to said forward traction wheels;

cross-axis gearing including said drive gear and a driving gear meshing with said drive gear; said transmission power output shaft extending toward said driving gear;

a final transaxle gear drive located between said engine and said transmission mechanism having differential gearing with axle drive gears for said forward traction wheels, a geared connection between said power output shaft and separate ones of said axle drive gears, each axle drive gear being adapted to be connected drivably to an axle shaft;

said crankshaft having multiple crank portions, said drive gear being mounted on one axial side of one of said crank portions, said driving gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driving gear and said one crank portion is avoided;

a hydrokinetic unit having a turbine and an impeller in toroidal fluid flow relationship, said hydrokinetic unit being located between said final transaxle gear drive and said power transmission mechanism, said driving gear being connected to said impeller and said turbine being connected to said power input shaft whereby said driving gear is drivably connected to said power input shaft, said engine and said transmission mechanism from a compact, unitary drive assembly; and a rear differential gear means for delivering torque from said power output shaft to said rearward traction wheels.

* * * * *

UNITED STATES PATENT AND TRADEMARK OFFICE
CERTIFICATE OF CORRECTION

PATENT NO. : 5,162,025
DATED : November 10, 1992
INVENTOR(S) : Donald L. Carriere It is certified that error appears in the above-identified patent and that said Letters Patent is hereby corrected as shown below:

Col. 1, line 34, before "axle" insert --two--.

Col. 1, line 66, before "the engine" (second occurrence) insert --between--.

Col. 7, line 42, after "clutch C" insert --1--.

Column 8, line 58, before "of" delete "? art" and insert --Part--.

Col. 11, line 19, claim 2, delete "Cranksahft" and insert --Crankshaft--.

Signed and Sealed this

Ninth Day of November, 1993

Attest:

BRUCE LEHMAN

Attesting Officer

Commissioner of Patents and Trademarks